United States Patent
Batra et al.

(10) Patent No.: US 10,324,720 B2
(45) Date of Patent: *Jun. 18, 2019

(54) TESTING COMPUTER SOFTWARE USING TRACKING BITS

(71) Applicant: International Business Machines Corporation, Armonk, NY (US)

(72) Inventors: Gaurav Batra, Cedar Park, TX (US); Demetrice Browder, Round Rock, TX (US); Douglas J. Griffith, Spicewood, TX (US); Sreenivas Makineedi, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 258 days.

This patent is subject to a terminal disclaimer.

(21) Appl. No.: 15/060,513

(22) Filed: Mar. 3, 2016

(65) Prior Publication Data

US 2017/0161168 A1 Jun. 8, 2017

Related U.S. Application Data

(63) Continuation of application No. 14/960,540, filed on Dec. 7, 2015.

(51) Int. Cl.
*G06F 9/30* (2018.01)
*G06F 11/36* (2006.01)
*G06F 11/34* (2006.01)

(52) U.S. Cl.
CPC ........ *G06F 9/30058* (2013.01); *G06F 9/3005* (2013.01); *G06F 9/30061* (2013.01);
(Continued)

(58) Field of Classification Search
CPC ............ G06F 11/3644; G06F 11/3668; G06F 11/3688; G06F 11/3692; G06F 9/30058; G06F 11/3676
See application file for complete search history.

(56) References Cited

U.S. PATENT DOCUMENTS 4,742,466 A 5/1988 Ochiai et al.
5,050,168 A 9/1991 Paterson
(Continued)

OTHER PUBLICATIONS

Prather and Myers, Jr., "The Path Prefix Software Testing Strategy", IEEE, 1987. (Year: 1987).*
(Continued)

*Primary Examiner* — Benjamin P Geib
(74) *Attorney, Agent, or Firm* — Martin & Associates, LLC; Derek P. Martin

(57) ABSTRACT

A system and method tests computer software using tracking bits in branch instructions to track portions of the software that have been tested. The tracking bits are bits of a branch programming instruction and may be repurposed hint bits used in the prior art to control pre-fetch of instructions. A branch tracking unit sets bits in a branch instruction of an application or program being tested. The branch tracing unit sets a first bit if a branch is taken and sets a second tracking bit if the branch is not taken. The modified program instructions can be analyzed after running the test inputs to determine if any branches in the software have not been exercised by the test inputs.

18 Claims, 7 Drawing Sheets

(52) U.S. Cl.
CPC ...... *G06F 9/30145* (2013.01); *G06F 9/30185* (2013.01); *G06F 11/34* (2013.01); *G06F 11/364* (2013.01); *G06F 11/368* (2013.01); *G06F 11/3676* (2013.01); *G06F 11/3688* (2013.01); *G06F 11/3692* (2013.01)

(56) References Cited

U.S. PATENT DOCUMENTS

| | | |
|---|---|---|
| 6,233,679 B1 | 5/2001 | Holmberg |
| 6,289,442 B1 | 9/2001 | Asato |
| 6,574,727 B1 | 6/2003 | Davidson et al. |
| 6,959,431 B1 | 10/2005 | Shiels et al. |
| 7,480,899 B2 | 1/2009 | Dimpsey et al. |
| 8,443,171 B2 | 5/2013 | Morris et al. |
| 8,732,676 B1 | 5/2014 | Kolawa et al. |

OTHER PUBLICATIONS

Strazdins et al., "Efficient Cycle-Accurate Simulation of the UltraSPARC III CPU", Proceedings of the Thirtieth Australasian Conference on Computer Science, vol. 62, Australian Computer Society, Inc., 2007.

Lu et al., "PathExpander: Architectural Support for Increasing the Path Coverage of Dynamic Bug Detection", Proceedings of the 39th Annual IEEE/ACM International Symposium on Microarchitecture, IEEE Computer Society, pp. 38-52, Dec. 1, 2006.

Batra et al., "Testing Computer Software Using Tracking Bits" U.S. Appl. No. 14/960,540, filed Dec. 7, 2015.

\* cited by examiner

| Tracking Bits | Meaning |
|---|---|
| 0 0 | Neither Path Taken |
| 0 1 | Branch Taken at Least Once |
| 1 0 | Branch Not Taken at Least Once |
| 1 1 | Both Paths Taken at Least Once |

TESTING COMPUTER SOFTWARE USING TRACKING BITS

BACKGROUND

1. Technical Field

This disclosure generally relates to computer software development, and more specifically relates to a system and method for testing computer software using tracking bits in branch instructions to track portions of the software that have been tested.

2. Background Art

Testing new software is an important part of the software development process. Software is composed of many software instructions. The instructions take different paths that are determined by branch instructions. To fully test the software, developers need to insure that testing includes applying input to the program to cause the program to take both possible paths at each branch instruction at least once in the testing life cycle of the program. If not all paths are tested, then defects may not be found until software deployment. Identifying and correcting software defects after software deployment increases costs and reduces customer satisfaction. The prior art methodologies for branch testing use exhaustive recording and reporting techniques to track code execution behaviors of the program. These tools require extensive memory and processing power o track information after executing each instruction.

BRIEF SUMMARY

The disclosure and claims herein provide a system and method for testing computer software using tracking bits in branch instructions to track portions of the software that have been tested. The tracking bits are bits of a branch programming instruction and may be repurposed hint bits used in the prior art to control pre-fetch of instructions. A branch tracking unit sets bits in a branch instruction of an application or program being tested. The branch tracking unit sets a first bit if a branch is taken and sets a second tracking bit if the branch is not taken. The modified branch instructions can be analyzed after running the tests to determine if any branches in the software have not been exercised by the tests.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

The disclosure and claims herein relate to a system and method for testing computer software using tracking bits in branch instructions to track portions of the software that have been tested. The tracking bits are bits of a branch programming instruction and may be repurposed hint bits used in the prior art to control pre-fetch of instructions. A branch tracking unit sets bits in a branch instruction of an application or program being tested. The branch tracking unit sets a first bit if a branch is taken and sets a second tracking bit if the branch is not taken. The modified branch instructions can be analyzed after running the tests to determine if any branches in the software have not been exercised by the tests.

Figure 1:
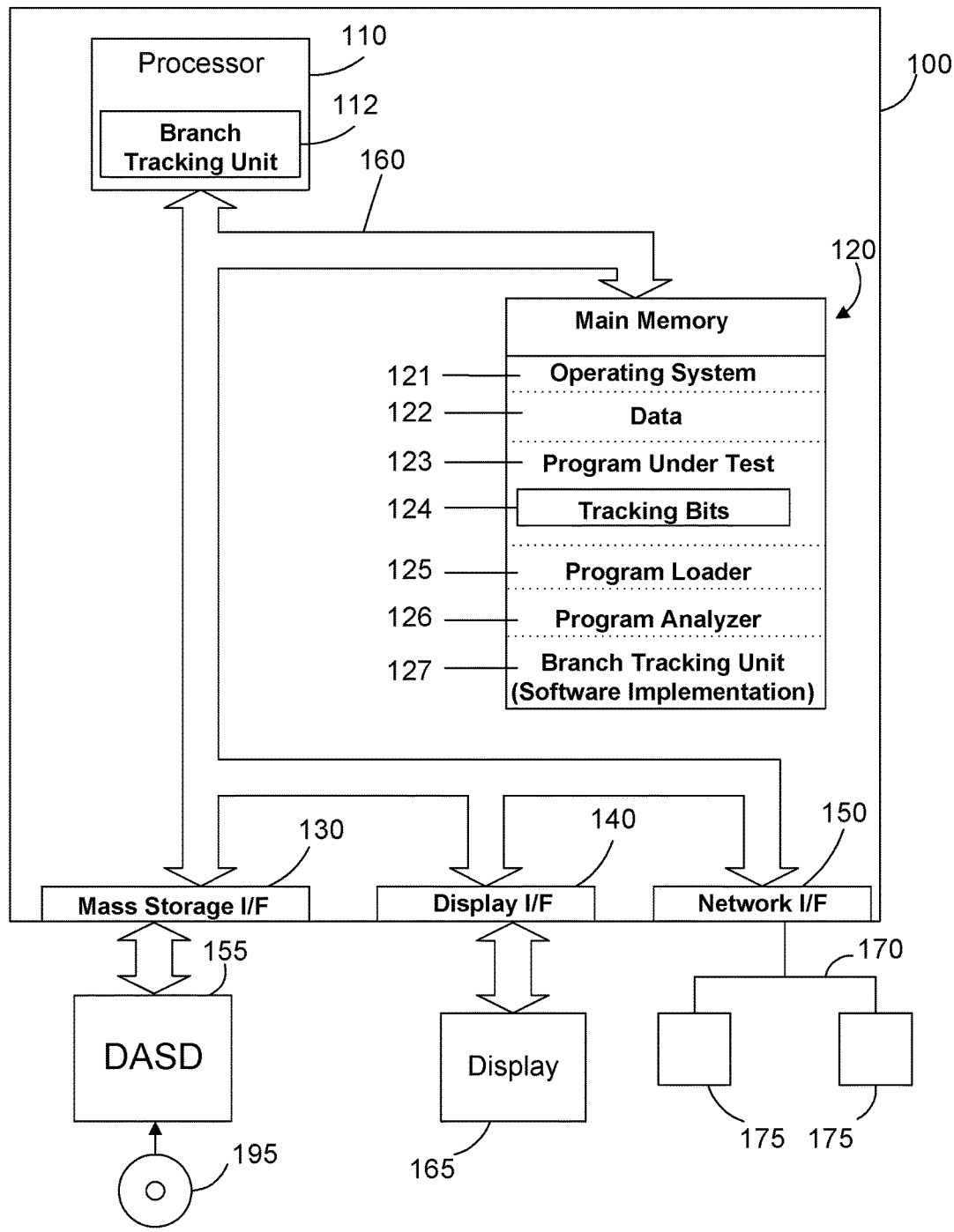
FIG. 1 is a block diagram a computer system with a branch tracking unit as described herein.

Referring to FIG. 1, a computer system 100 is one suitable implementation of a computer system that includes a system for testing computer software using tracking bits in branch instructions as described herein. Computer system 100 is a computer which can run multiple operating systems including the IBM i operating system. However, those skilled in the art will appreciate that the disclosure herein applies equally to any computer system, regardless of whether the computer system is a complicated multi-user computing apparatus, a single user workstation, laptop, phone or an embedded control system. As shown in FIG. 1, computer system 100 comprises one or more processors 110. The processor 110 may contain a branch tracking unit 112 as described further below. The computer system 100 further includes a main memory 120, a mass storage interface 130, a display interface 140, and a network interface 150. These system components are interconnected through the use of a system bus 160. Mass storage interface 130 is used to connect mass storage devices with a computer readable medium, such as direct access storage devices 155, to computer system 100. One specific type of direct access storage device 155 is a readable and writable CD-RW drive, which may store data to and read data from a CD-RW 195. Some devices may have a removable memory card or similar for a direct access storage device 155 instead of the CD-RW drive.

Main memory 120 preferably contains an operating system 121. Operating system 121 is a multitasking operating system known in the industry as IBM i; however, those skilled in the art will appreciate that the spirit and scope of this disclosure is not limited to any one operating system. The memory 120 further includes data 122 and a program under test (PUT) 123 with tracking bits 124. The memory 120 also includes a program loader 125 and a program analyzer 126. Alternatively, the memory 120 may include a branch tracking unit 127 for a software implementation as described further below. As used herein, the term branch tracking unit may refer to the branch tracking unit 112 in hardware or the branch tracking unit 127 in memory 120.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while operating system 121, data 122, program under test 123, tracking bits 124, program loader 125, program analyzer 126 and the alternative branch tracking unit 127 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 121 and later executes the program instructions that make up the program under test 123, the program loader 125, the program analyzer 126 and the branch tracking unit 127.

Although computer system 100 is shown to contain only a single processor and a single system bus, those skilled in the art will appreciate that the system may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150, e.g. web client based users.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
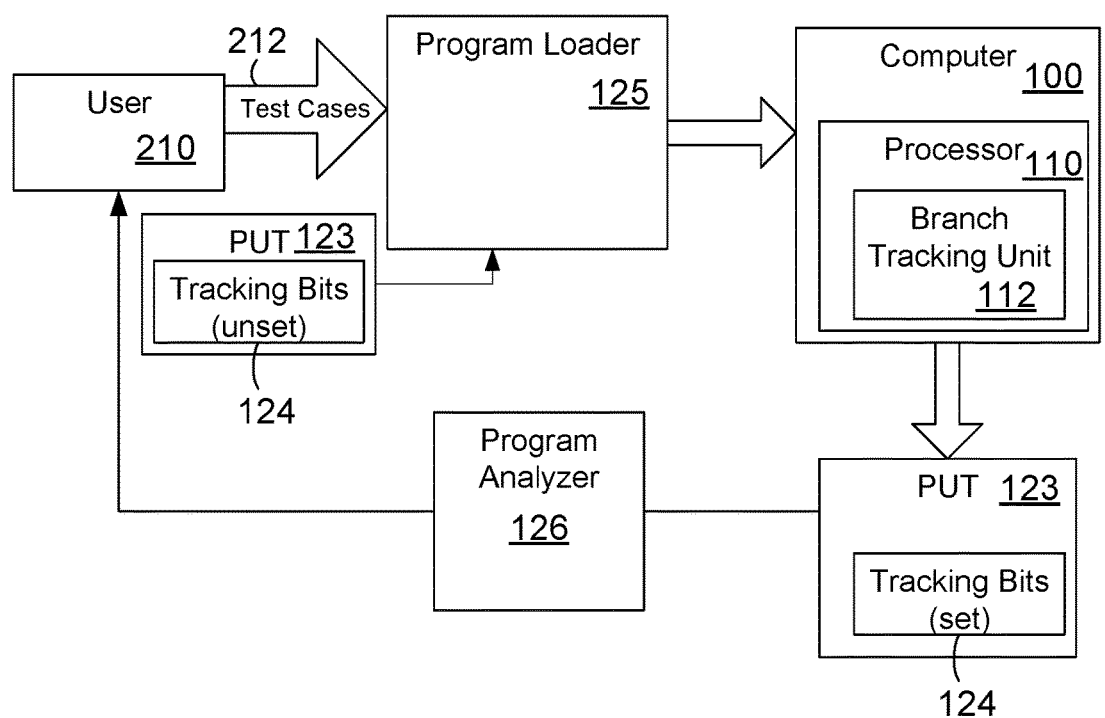
FIG. 2 is a simplified block diagram of a system for testing computer software using tracking bits in branch instructions.

FIG. 2 illustrates a simplified block diagram of a system for testing computer software using tracking bits in branch instructions. A user 210 or an operator provides tests cases 212 and a program under test 123 to a program loader 125. The test cases 212 provide input to the program under test 123 to exercise the program under test 123 in a manner similar to the prior art. The program loader 125 loads the program under test 123 and the test cases 212 into the computer 100 to test the program under test 123 with the test cases 212. The program under test 123 includes tracking bits 124 that are unset. The computer 100 includes a branch tracking unit 112. In this example, the branch tracking unit 112 resides in the processor 112. The branch tracking unit 112 helps insure that the test cases 212 provided by the user test all possible paths of the computer software using tracking bits 124 in branch instructions. The tracking bits 124 are bits of a branch programming instruction. The tracking bits 124 may be similar to hint bins known in the prior art or may be repurposed hint bits used in the prior art to control pre-fetch of instructions. As used herein, repurposed hint bits means that the same bits used for hint bits in the branch instruction during normal runtime are used as tracking bits during testing. If repurposed hint bits are used, the computer 100 is set to not use the hint bits in the normal manner. The branch tracking unit 112 sets one or more tracking bits 124 in each branch instruction. For example, the branch tracking unit 112 sets a first tracking bit in a branch instruction if a branch is taken and sets a second tracking bit in the branch instruction if the branch is not taken.

Again referring to FIG. 2, after setting the tracking bits 124, the branch tracking unit 112 may store the modified tracking bits in memory. For example, the branch tracking unit 112 modifies the tracking bits 124 that are part of the branch instruction in the program under test 123 stored in memory 120 (FIG. 1). A program analyzer 126 then analyzes the program under test 123 with the modified instructions after running the test cases 212 to determine if any branches in the software have not been exercised by the test cases 212. The program analyzer 126 reports to the user 210 if any of branches of the program under test 123 have not been exercised by the test cases 212. The program analyzer 126 may simply scan the program under test 123 for any branch instructions with unset tracking bits to find branches of the program that have not been exercised. If any branches have not been exercised, the user is notified so that the user can modify the test cases and try again to test all portions of the program under test.

Figures 3, 4:
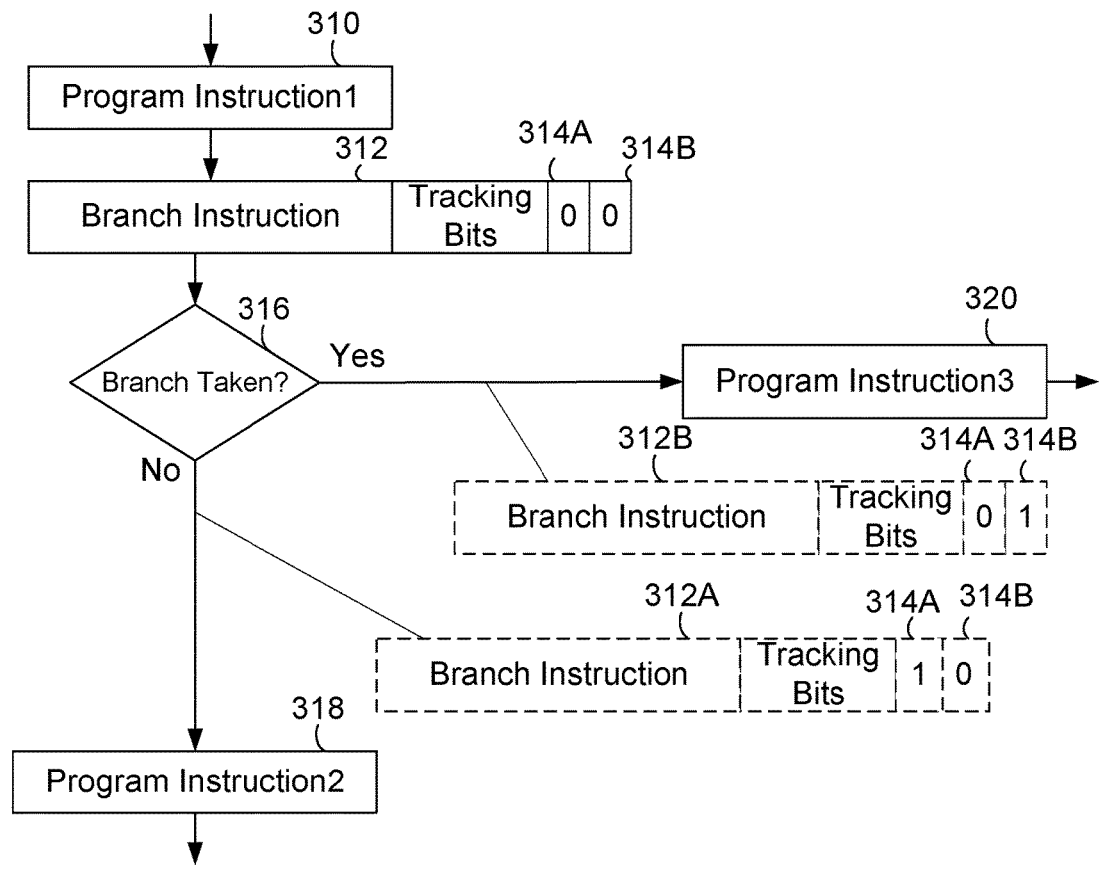
FIG. 3 is a simplified example of a branch instruction in software with tracking bits.
FIG. 4 is a table to illustrate the use of tracking bits.

FIG. 3 is a simplified example of a branch instruction in software with branch tracking bits as described herein. A first program instruction1 310 represents one instruction of the program under test 123 described above with reference to FIG. 1 and FIG. 2. After executing the first program instruction1 310, the processor encounters a branch instruction 312. The branch instruction 312 includes two tracking bits 314A, 314B. Prior to execution of the branch instruction, the two tracking bits are initially unset, or for this example have a logical 0 value. The processor evaluates the branch instruction 312 to determine whether to branch or not based on the branch instruction and the state of the variables of the branch instruction in a manner similar to the prior art. If the processor determines the branch should not be taken, then the processor proceeds to program instruction2 318. If the processor determines the branch should be taken, then the processor proceeds to program instruction3 320. In each case the processor would continue to process subsequent program instructions (not shown) in the normal manner.

Again referring to FIG. 3, the branch instruction 312 includes two tracking bits 314A, 314B that are initially unset when the processor first encounters the branch instruction 312. The branch tracking unit 112 (FIG. 1 and FIG. 2) monitors the execution of branch instructions and sets the tracking bits according to whether the branch is taken or not taken. If the branch 316 is not taken (step 316=no), then the branch tracking unit 112 modifies the branch instruction 312 to change a tracking bit to indicate the branch was not taken as shown in the modified branch instruction 312A. In this example, the branch tracking unit 112 changes the left most tracking bit 314A to a logical one. The tracking bit 314A may be set directly to a logical one or a logical OR function may be used to OR the contents of the tracking bit 314A with a logical 1. Alternatively, a logical "0" could be used to indicate the branch was taken. Conversely, if the branch 316 is taken (step 316=yes), then the branch tracking unit 112 modifies the branch instruction 312 to change a tracking bit to indicate the branch was taken as shown in the modified branch instruction 312B. In this example, the branch tracking unit 112 changes the right most tracking bit 314B to a logical one. In FIG. 3, the branch instructions 312A and 312B are shown in broken lines to illustrate that these are not new instructions encountered by the processor, but are a modified version of the same branch instruction 312 being processed as described above. The modified branch instructions 312A and 312B are shown to illustrate how the branch instruction 312 changes at different times depending on the program flow.

FIG. 4 is a table to illustrate the use of branch tracking bits 124 introduced above with reference to FIG. 1 and FIG. 2. In the examples described herein, there are two tracking bits that each can take on a binary value of 1 or 0. The left portion of the table has each of the four possible combinations for the 2 binary bits, namely 00, 01, 10 and 11. On the right hand side of the table, a meaning is listed for each combination of the tracking bits as used in the examples herein. The combination of tracking bits "00" means that neither path of the branch instruction has been taken or exercised for the test. The combination of tracking bits "01" means the branch has been taken at least once. The combination of tracking bits "10" means the branch has not been taken at least once. And the combination of tracking bits "11" means both paths of the branch have been taken at least once. It will be recognized by one of ordinary skill in the art that the assignment of bits in FIG. 4 is only one example how the bits could be assigned and used as described herein. For example, the assignments of the bit for the branch taken and the bit for the branch not taken could be any available bits of the branch instruction such as hint bits or newly assigned bits for tracking bits.

As introduced in FIG. 1, the branch tracking unit 112 may be located in the processor 110 or in memory 120. A hardware implementation of the branch tracking unit in the processor may take the place of or operate in conjunction with the circuitry that normally uses the hint bits as known in the prior art. If the branch tracking unit is implemented in conjunction with hint bits then the use of hint bits may need to be turned off while testing the software where the same bits of the branch instruction used for testing branch as described herein are repurposed hints bits. The logic of the branch tracking unit 112 then will be used to detect the branch taken or not taken and sets the bits as shown in FIG. 4.

As described above, the branch tracking unit 112 may be implemented in software 127 and located in memory 120 as shown in FIG. 1. A software implementation of the branch tracking unit could operate similar to prior art technologies that use a software "trap" to identify a branch instruction. After detecting the branch, the branch tracking unit 127 sets tracking bits 124 to record the branch taken or not taken as described above and shown in FIG. 4. While a software implementation 127 of the branch tracking unit 112 would be require more computer processing resources it could reduce the amount of memory needed to record the results of testing the software by taking advantage of repurposed hint bits in the branch instructions.

Figure 5:
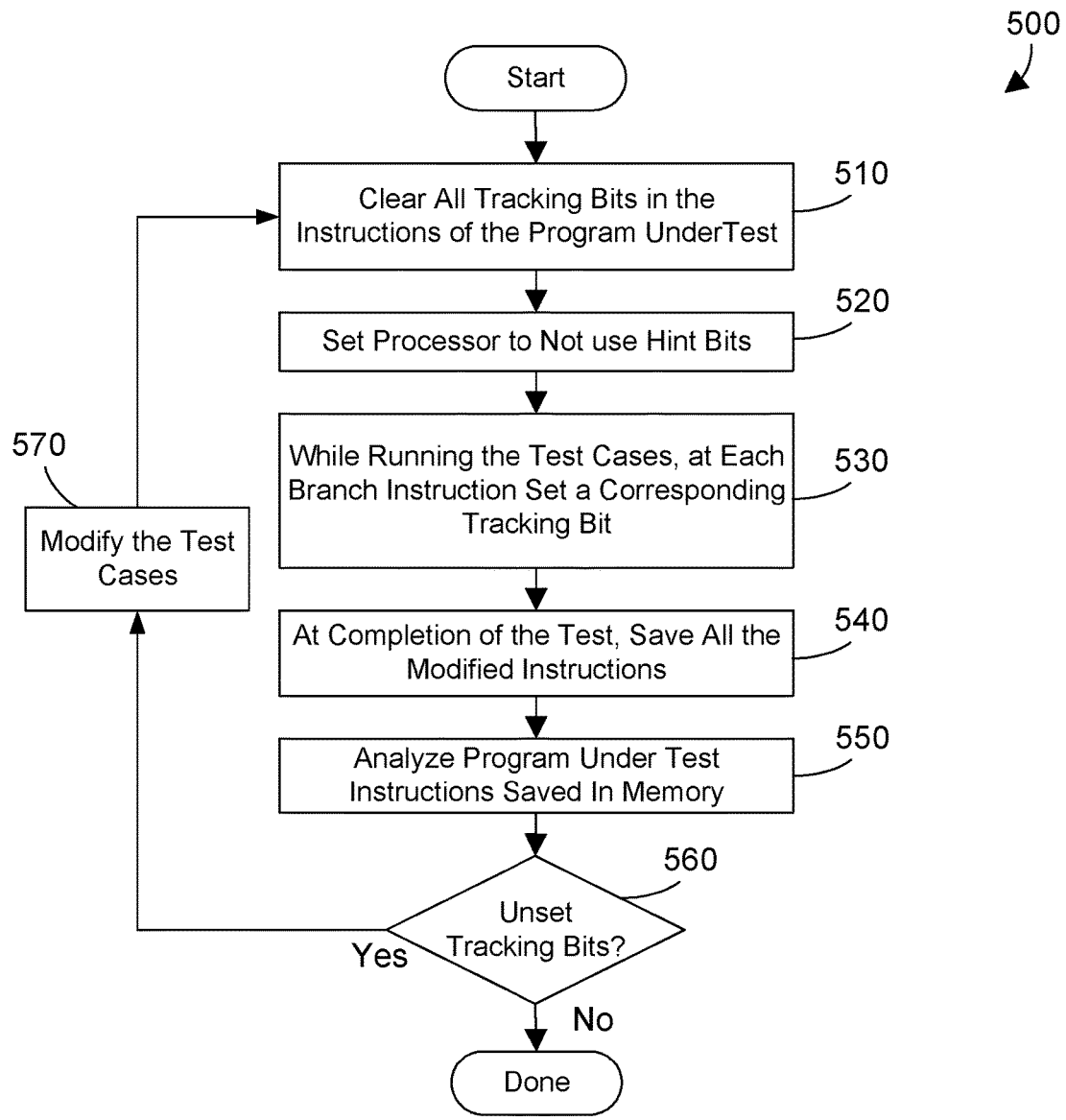
FIG. 5 is a flow diagram of a method for testing computer software using tracking bits in branch instructions.

Referring to FIG. 5, a method 500 shows one suitable example for testing computer software using tracking bits in branch instructions. Portions of method 500 are preferably performed by the branch tracking unit 112 shown in FIG. 1. First, optionally clear all tracking bits in the branch instructions of the program under test (step 510). This step is optional since the user may want to run several sets of test cases against the program under test and combine the results. This is possible since the tracking bits are set but are not cleared by the branch tracking unit during test operation.

Next, set up the processor to not use hint bits (step 520). While running test cases on the program under test, at each branch instruction set a corresponding tracking bit for each path (step 530). At completion of the test case(s), save the modified instructions (step 540). Analyze the program under test instructions saved in memory (step 550). If there are unset tracking bits (step 560=yes) then modify the test cases (step 570) and return to step 510. If there are no unset tracking bits (step 560=no) then method 500 is then done.

Figure 6:
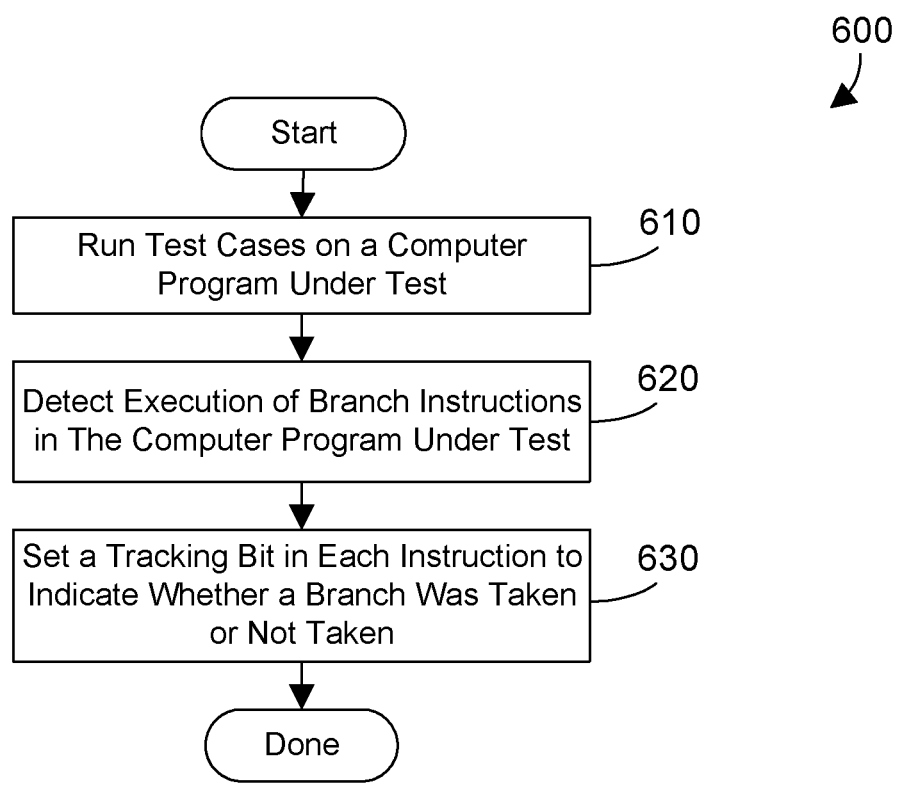
FIG. 6 is a flow diagram of a specific method for step 530 in FIG. 5.

FIG. 6 shows one suitable example of a method 600 for setting tracking bits to test branch instructions in computer software. Method 600 thus shows a suitable method for performing step 530 in method 500. First, run test cases on a computer program under test (step 610). Detect execution of branch instructions in the computer program under test (step 620). Set a tracking bit in each branch instruction to indicate whether the branch was taken or not taken (step 630). The method 600 is then done.

Figure 7:
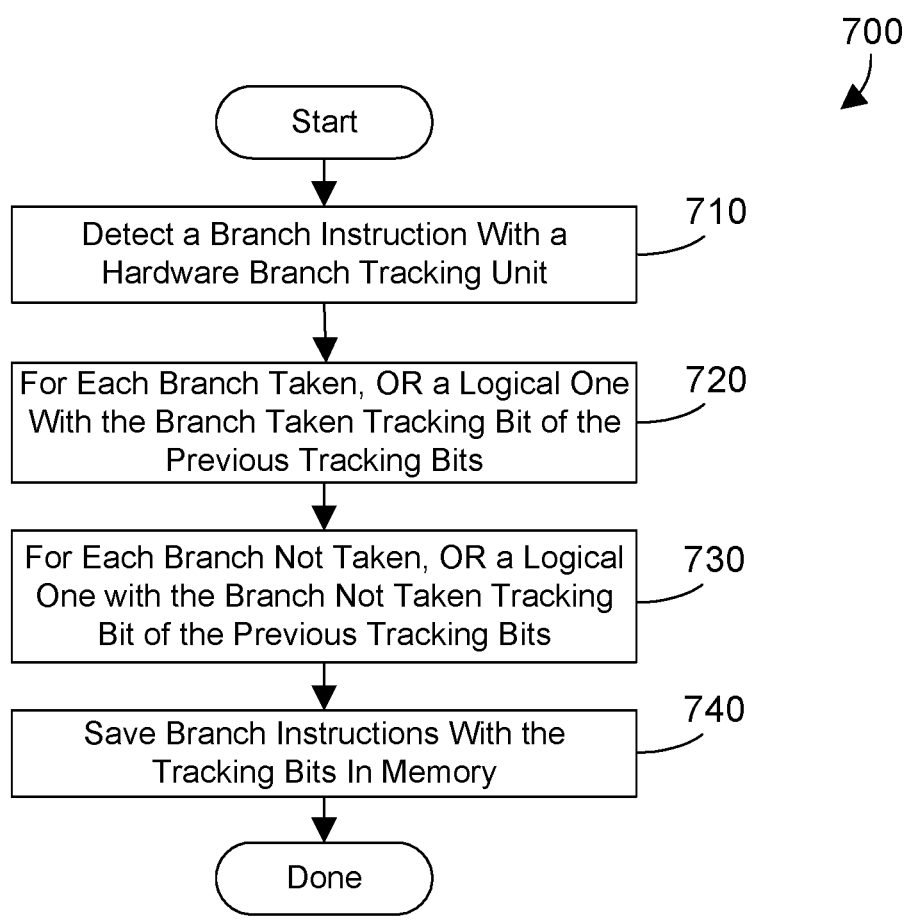
FIG. 7 is a flow diagram of another specific method for step 530 in FIG. 5.

FIG. 7 shows one suitable example of a method 700 for setting tracking bits to test branch instructions in computer software. Method 700 thus shows a suitable method for performing step 530 in method 500. First, detect a branch instruction with a hardware branch tracking unit (step 710). For each branch taken, OR a logical one with a branch taken tracking bit of the branch tracking bits in the branch instruction (step 720). For each branch not taken, OR a logical one with a branch not taken tracking bit of the branch tracking bits in the branch instruction (step 730). Save the branch instructions with the tracking bits in memory (step 740). The method 700 is then done.

Figure 8:
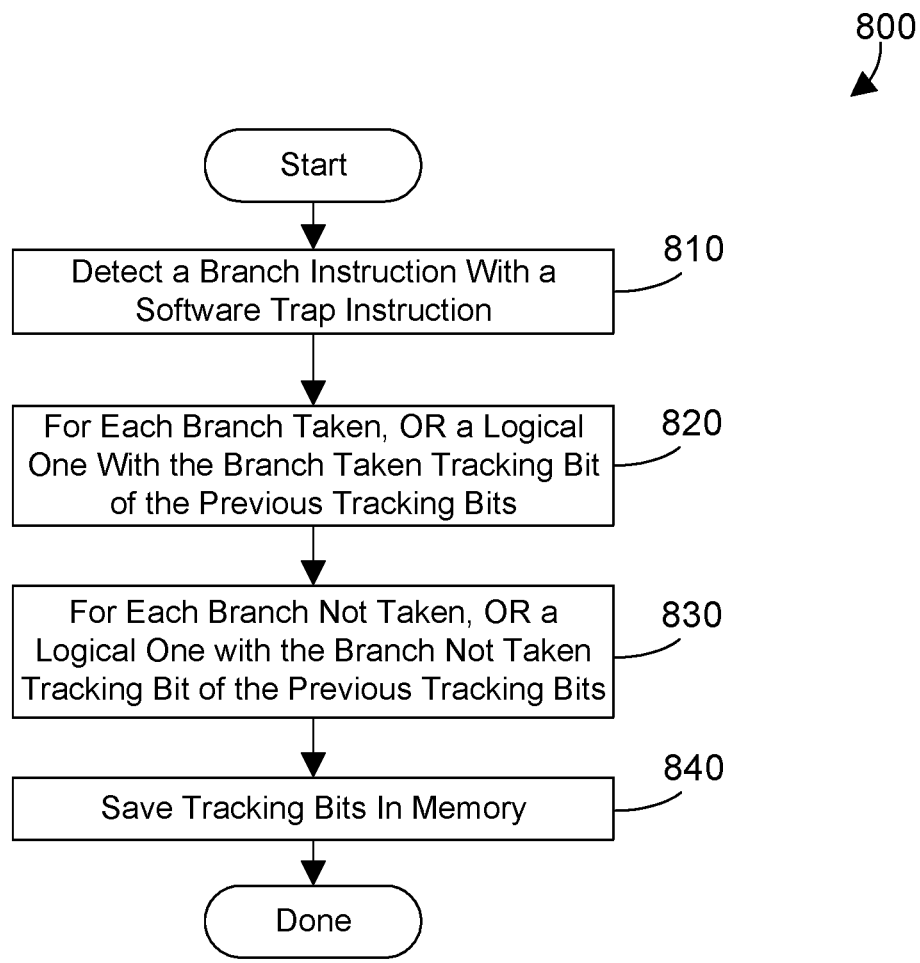
FIG. 8 is a flow diagram of another specific method for step 530 in FIG. 5.

FIG. 8 shows one suitable example of a method 800 for setting tracking bits to test branch instructions in computer software. Method 800 thus shows another suitable method for performing step 530 in method 500. First, detect a branch instruction with a software trap instruction (step 810). For each branch taken, OR a logical one with a branch taken tracking bit of the branch tracking bits in the branch instruction (step 820). For each branch not taken, OR a logical one with a branch not taken tracking bit of the branch tracking bits in the branch instruction (step 830). Save the branch instructions with the tracking bits in memory (step 840). The method 800 is then done.

The disclosure and claims herein relate to a system for testing computer software using tracking bits in branch instructions to track portions of the software that have been tested. A branch tracking unit sets tracking bits in a branch instruction of an application or program being tested to help the user insure all possible paths of the program are tested.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer-implemented method executed by at least one processor for testing a computer program comprising:
running test cases on a computer program where the at least one processor is set to turn off the use of hint bits during testing of the computer program;
detecting execution of a plurality of branch instructions in the computer program; and
setting branch tracking bits in the plurality of branch instructions where the tracking bits are set to indicate whether or not a branch in the computer program was taken wherein the branch tracking bits comprise two binary bits of data in the branch instruction where the same two binary bits of data are used for hint bits in the branch instruction during normal runtime but are used as tracking bits during testing of the computer program, with a first bit that indicates the branch was taken and a second bit that indicates the branch was not taken; and analyzing the tracking bits stored in memory after running test cases provided by a user to determine if any tracking bits are unset to indicate branches in the computer program have not been exercised by the test cases.

2. The method of claim 1 further comprising setting the at least one processor to not utilize hint bits where the tracking bits in the branch instruction are repurposed hint bits.

3. The method of claim 1 wherein the tracking bits of the branch instruction are stored in a memory holding the computer program.

4. The method of claim 1 wherein the method is performed by a branch tracking unit comprising hardware logic in a processor executing the computer program.

5. The method of claim 1 wherein the method is performed by a branch tracking unit that comprises software that detects the branch instruction and sets the branch tracking bits in the branch instruction.

6. The method of claim 1 wherein the branch tracking bits comprise two binary bits of data in the branch instruction with a first bit that indicates the branch was taken and a second bit that indicates the branch was not taken.

7. The method of claim 1 further comprising receiving test cases and the computer program from a user and loading them into a processor to set the tracking bits for each branch instruction of the computer program.

8. The method of claim 1 further comprising modifying the test cases where there are unset tracking bits.

9. A computer-implemented method executed by at least one processor for testing a computer program comprising:

running test cases on a computer program where the at least one processor is set to turn off the use of hint bits during testing of the computer program;

detecting execution of a plurality of branch instructions in the computer program;

setting branch tracking bits in the plurality of branch instructions where the tracking bits are set to indicate whether or not a branch in the computer program was taken, wherein the branch tracking bits comprise two binary bits of data in the branch instruction where the same two binary bits of data are used for hint bits in the branch instruction during normal runtime but are used as tracking bits during testing of the computer program, with a first bit that indicates the branch was taken and a second bit that indicates the branch was not taken; and modifying the test cases where there are unset tracking bits.

10. The method of claim 9 further comprising setting the at least one processor to not utilize hint bits where the tracking bits in the branch instruction are repurposed hint bits.

11. The method of claim 9 wherein the tracking bits of the branch instruction are stored in a memory holding the computer program.

12. The method of claim 9 wherein the method is performed by a branch tracking unit comprising hardware logic in a processor executing the computer program.

13. The method of claim 9 wherein the method is performed by a branch tracking unit that comprises software that detects the branch instruction and sets the branch tracking bits in the branch instruction.

14. The method of claim 9 wherein the branch tracking bits comprise two binary bits of data in the branch instruction with a first bit that indicates the branch was taken and a second bit that indicates the branch was not taken.

15. The method of claim 9 further comprising receiving test cases and the computer program from a user and loading them into a processor to set the tracking bits for each branch instruction of the computer program.

16. A computer-implemented method executed by at least one processor for testing a computer program comprising:

clearing tracking bits in branch instructions of a program under test, wherein the branch tracking bits comprise two binary bits of data in the branch instruction where the same two binary bits of data are used for hint bits in the branch instruction during normal runtime but are used as tracking bits during testing of the computer program, with a first bit that indicates the branch was taken and a second bit that indicates the branch was not taken;

setting the at least one processor to not utilize hint bits where the tracking bits in the branch instruction are repurposed hint bits;

running test cases on a computer program where the test cases are provided by a user to determine if any tracking bits are unset to indicate branches in the computer program have not been exercised by the test cases;

detecting execution of a plurality of branch instructions in the computer program;

setting branch tracking bits in the plurality of branch instructions where the tracking bits are set to indicate whether or not a branch in the computer program was taken;

storing the tracking bits in a modified branch instruction in a memory holding the computer program;

analyzing the tracking bits stored in the memory after running test cases; and allowing a user to modify the test cases when there are unset tracking bits.

17. The method of claim 16 wherein the method is performed by a branch tracking unit comprising hardware logic in a processor executing the computer program.

18. The method of claim 16 wherein the method is performed by a branch tracking unit that comprises software that detects the branch instruction and sets the branch tracking bits in the branch instruction.

* * * * *